United States Patent
Anson et al.

(10) Patent No.: US 8,325,148 B2
(45) Date of Patent: Dec. 4, 2012

(54) SYSTEM AND METHOD FOR SECURE GESTURE INFORMATION HANDLING SYSTEM COMMUNICATION

(75) Inventors: Douglas Anson, Dripping Springs, TX (US); Gary Douglas Huber, Austin, TX (US); Yuan-Chang Lo, Austin, TX (US); William Dale Todd Nix, Austin, TX (US); Roy Stedman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 512 days.

(21) Appl. No.: 12/420,116

(22) Filed: Apr. 8, 2009

(65) Prior Publication Data
US 2010/0259486 A1    Oct. 14, 2010

(51) Int. Cl.
*G06F 3/041* (2006.01)
*G09G 5/00* (2006.01)
(52) U.S. Cl. .................. 345/173; 345/156; 715/863
(58) Field of Classification Search .................. None
See application file for complete search history.

(56) References Cited

U.S. PATENT DOCUMENTS

| 6,313,853 | B1 | 11/2001 | Lamontagne et al. | |
|---|---|---|---|---|
| 6,421,453 | B1 | 7/2002 | Kanevsky et al. | |
| 2009/0284482 | A1* | 11/2009 | Chin | 345/173 |
| 2011/0102369 | A1* | 5/2011 | Thorn | 345/174 |

* cited by examiner

*Primary Examiner* — Andrew L Sniezek
(74) *Attorney, Agent, or Firm* — Hamilton & Terrile, LLP; Robert W. Holland

(57) ABSTRACT

A secured communication channel is established between two or more information handling systems by defining attributes for encrypting information with physical inputs made at touch devices of the information handling systems. Inputting the physical gesture at a touch device of each information handling system allows evaluation of one or more attributes at each information handling system so that the shared secret of the physical gesture form the basis for encrypted communications. The touch device includes touch screens or touch pads and the attributes include gesture speed, plural distinct gesture touch points, movement of touch points relative to each other, or other attributes that are determinable from physical gesture inputs at each information handling system.

18 Claims, 2 Drawing Sheets

SYSTEM AND METHOD FOR SECURE GESTURE INFORMATION HANDLING SYSTEM COMMUNICATION

BACKGROUND OF THE INVENTION

1. Field of the Invention

The present invention relates in general to the field of information handling system communications, and more particularly to a system and method for secure gesture information handling system communication.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems have become increasingly common in every day tasks, the need to secure information from unauthorized access has presented an increasing challenge. Information handling systems are often protected by a number of different passwords, such as an administrative password, a user password and a hard disk drive password. In addition, access to information handling systems through networks is also protected with varying degrees of security based on user name and password authorization. Security failures can mean substantial damage to an enterprise or individual by making private documents public or by allowing theft from exposed accounts. Information crooks have grown increasingly sophisticated so that victims often do not know that their information is compromised until after it is too late to address the problem. For example, malware planted on an information handling system monitors for passwords and provides the passwords to thieves who use the information to steal from or otherwise damage unsuspecting end users. As smaller devices, such as cell phones, are designed to include greater intelligence, opportunities for malware access inevitably increases.

One important tool for securing information is the use of encryption so that unauthorized individuals cannot read encrypted information. Generally, for peers to engage in secured communications with encryption, each information handling system must acquire a shared secret that is used to create a secured communication channel. Normally, the shared secret is a password or key copied from a storage device. Of course, if the storage device is compromised, the password or key will not prevent unauthorized access to the secured communication channel. In addition, establishing and maintaining keys and passwords presents a logistical difficulty. Both sides of the secured communication channel typically must have access to the prearranged passwords and keys. However, as information handling systems become more common, end users have found themselves engaging in more frequent direct exchanges of information. End users sometimes seek such information exchanges on an ad hoc basis with other end users with whom they do not share common passwords or keys. For example, a sales person downloads a presentation to a customer's information handling system using wireless communication in a hotel lobby or airport. In order to ensure that the presentation remains confidential, the sales person and customer have set up a password or key before the wireless exchange. Because exchanging a shared secret is somewhat of a hassle and time consuming, this step is often skipped resulting in exposure of confidential information.

SUMMARY OF THE INVENTION

Therefore a need has arisen for a system and method which quickly and easily establishes a shared secret between information handling systems to establish a secured communication channel.

In accordance with the present invention, a system and method are provided which substantially reduce the disadvantages and problems associated with previous methods and systems for establishing a secured communication channel. A key to encrypt information is derived from one or more attributes of a physical gesture performed at a touch device. A secure communication channel between plural information handling systems is established by repeating the physical gesture at a touch device of each information handling system with the attributes of the physical gesture acting as a common secret from which to build an encryption scheme.

More specifically, plural information handling systems each have plural processing components that cooperate to process information, such as a CPU, RAM, a hard disk drive and a chipset. Each information handling system has a touch device that accepts physical gesture inputs, such as a touch screen display or a touch pad mouse. A security module on each information handling system determines one or more attributes of a physical gesture input at the touch device, such as one or more touch positions, a shape formed by a moving touch, speed of movement associated with a touch, coordinated movements of multiple touch points, touch pressure or other attributes. By performing substantially the same physical gesture at each of plural information handling systems, the security module of each information handling system applies the attributes of the physical gesture at each information handling system to generate a common key, such as a hash or signature from which an encryption scheme is built. Each information handling system having the attributes of the physical gesture can then securely communicate information through a secure communication channel with other information handling systems having the attributes of the physical gesture.

The present invention provides a number of important technical advantages. One example of an important technical advantage is that a secured communication channel is quickly and easily established by repeating a physical gesture on information handling system touch devices. The physical gesture creates a shared or common secret that allows the information handling systems to encrypt information for communication through a secured channel. A physical gesture is easily mimicked when end users are in close proximity of each other or explained by verbal communication when the end users are further apart. The use of a physical gesture provides a great variety of possible passwords that are difficult to copy or anticipate.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A physical gesture input at a touch device of each of plural information handling systems forms the basis for a secured communication channel between the plural information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
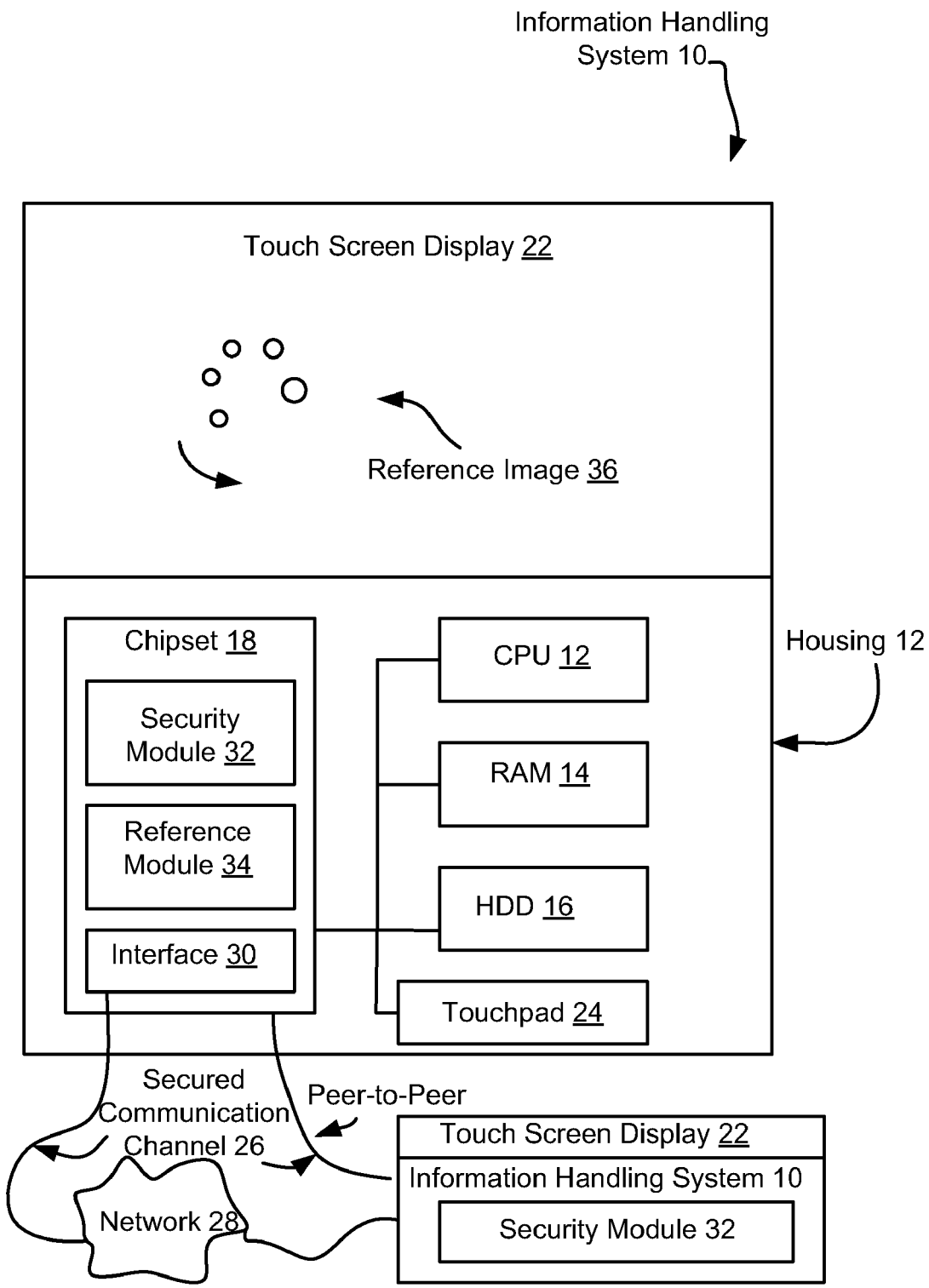
FIG. 1 depicts a block diagram of a system for creating a secure communication channel with physical gestures input at a touch device of an information handling system.

Referring now to FIG. 1, block diagram depicts a system for creating a secure communication channel with physical gestures input at a touch device of an information handling system 10. Information handling system 10 has plural processing components disposed in a housing 12 that cooperate to process information, such as a CPU 14, RAM 16, a hard disk drive 18 and a chipset 20. For example, CPU executes instructions retrieved from hard disk drive 18 and stored on RAM 16. Chipset 20 coordinates operation of the processing components on a physical level. Visual information generated by the processing components is presented as visual images at a display 22, such as a touch screen display that accepts physical inputs made by touching the screen surface. In addition to accepting inputs through touch screen 22, information handling system 10 accepts inputs through a touch pad 24 that acts as a mouse.

Information handling system 10 communicates with other information handling systems through one or more communication channels 26. Communication channel 26 can be a direct peer-to-peer channel or a channel established through a network 28, such as a local area network (LAN), wide area network (WAN) or the Internet. For example, communication channel 26 is supported through an interface 30, such as a Bluetooth interface, a TCP/IP interface, a wireless 802.11g or other LAN interface, a personal area network (PAN), an ultra-wideband network (UWB), an infrared interface, a near field interface, an Ethernet interface, or other type of communication interface. Information sent through communication channel 26 is encrypted to provide security with the encryption based upon attributes of a physical gesture input at a touch device of information handling system 10, such as physical touches made at touch screen display 22 or touchpad 24. For example, the attributes of a gesture input at touch screen display 22 or touch pad 24 are used as a key, password or personal identification number (PIN) to encrypt or decrypt information according to any of available conventional security protocols.

In order to establish a secured communication channel 26 between plural information handling systems 10, an end user at each of the plural information handling systems 10 inputs a common physical gesture at a touch device, such as touch screen 22 or touch pad 24. A security module 32 of each information handling system, such as a set of firmware instructions running on chipset 20, analyzes the physical gesture input and applies attributes of the physical gesture for use as a key seed generator that forms the basis for encrypting and decrypting information. For example, attributes of the physical gesture are hashed or signed so that the resultant value is used as an encryption key. By performing the same physical gesture at each information handling system, the information handling systems have a shared secret, i.e., predetermined attributes of the physical gesture, to form a secure communication channel 26. The attributes of the physical gesture include one or more of touch positions on the touch device, movements at one or more touch positions, speed of movement, movement in a pattern, such as by rotation or parallel lines, pressure applied at touch points, designs or words spelled out by touches. A reference module 34 provides a reference image 36 presented on display 22 to aid in the input of a touch pattern. For example, reference image 36 depicts the placement of four fingers and a thumb with rotation to the left as a physical gesture. Reference image 36 can help guide an end user input of a physical gesture or can show an end user what the physical gesture appeared as when the physical gesture was input.

As an example, an end user who wants to establish a secure communication channel with another end user first enters a physical gesture at a touch device of a first information handling system, such as a unique arrangement of touch points with each touch point performed by a finger of the end user. Movement of the touch points in a specific direction or at a specific speed across the touch device adds further attributes that are available to generate an encryption key. Security module 32 applies the attributes to an encryption protocol to encrypt information sent from the information handling system. An end user of the receiving information handling system performs the same physical gesture at a touch device of the receiving information handling system to allow the receiving information handling system to apply the attributes of the physical gesture to generate the encryption key. Some level of variation between the physical gestures is allowed to help generate a common encryption key. The receiving information handling system uses the encryption key derived from the physical gesture to decrypt the encrypted information for use at the receiving information handling system.

Figure 2:
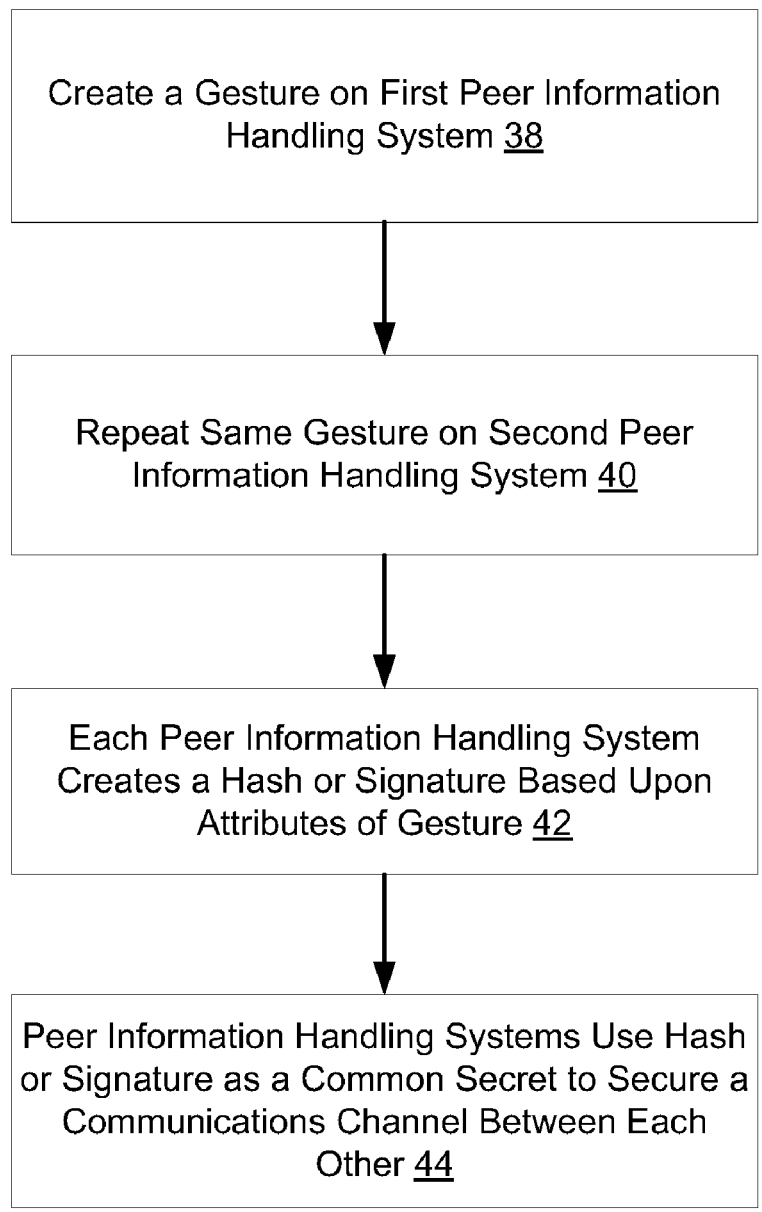
FIG. 2 depicts a flow diagram of a process for creating a secure communication channel with physical gestures input at a touch device of an information handling system.

Referring now to FIG. 2, a flow diagram depicts a process for creating a secure communication channel with physical gestures input at a touch device. The process begins at step 38 with an end user performing a gesture on a first peer information handling system. At step 40, an end user repeats the same physical gesture on a second peer information handling system. At step 42, each peer creates a hash or signature based upon attributes of the common physical gesture. At step 44, the peers use the hash or signature as a secret to secure a channel for communication between them. The code may be deleted upon completion of the secure communication or saved for subsequent use.

Although the present invention has been described in detail, it should be understood that various changes, substitutions and alterations can be made hereto without departing from the spirit and scope of the invention as defined by the appended claims.

What is claimed is:

1. An information handling system comprising:
   plural processing components operable to process information;
   a touch device operable to accept one or more physical gestures of an end user and to save one or more predetermined attributes of the one or more physical gestures;
   a security module interfaced with the touch device, the security module operable to apply the predetermined attributes to define a secured communication channel with one or more other information handling systems having physical attributes created with the same one or more physical gestures; and
   a reference module operable to present a visual image as a reference for performing the one or more physical gestures at the touch device, the reference aiding input at the touch device of the same one or more physical gestures.

2. The information handling system of claim 1 wherein the touch device comprises a touch screen operable to present visual images.

3. The information handling system of claim 1 wherein the predetermined attributes comprise the speed of the gesture at the touch device.

4. The information handling system of claim 1 wherein the predetermined attributes comprise a number of distinct touch points.

5. The information handling system of claim 1 wherein the predetermined attributes comprise a predetermined rotational movement.

6. The information handling system of claim 1 wherein the secured communication channel comprises encrypted Transmission Control Protocol/Internet Protocol ("TCP/IP") communications.

7. The information handling system of claim 1 wherein the secured communication channel comprises a wireless network.

8. A method for securely communicating information between plural information handling systems, the method comprising:
   inputting a physical gesture at a touch device of a first information handling system;
   presenting a visual image at a display of a second information handling system, the visual image providing a guide for performing the physical gesture at a touch device of the second information handling system;
   inputting the physical gesture at the touch device of the second information handling system; and
   creating a secure communication channel between the first and second information handling systems by encrypting and decrypting information communicated between the first and second information handling systems using one or more attributes of the physical gesture.

9. The method of claim 8 wherein the touch device comprises a touchpad that accepts mouse inputs.

10. The method of claim 8 wherein the touch device comprises a touch screen operable to present information as visual images.

11. The method of claim 8 wherein the physical gesture attributes comprise a speed of the physical gesture.

12. The method of claim 8 wherein the physical gesture attributes comprise a number of simultaneous touch points.

13. The method of claim 8 wherein the physical gesture attributes comprise a rotation of one or more touch points.

14. The method of claim 8 wherein the secure communication channel comprises a wireless interface between the information handling systems.

15. A system for secure communications between information handling systems, the system comprising:
   a touch device operable to accept physical gesture inputs and to save attributes of the physical gesture inputs, the touch device having a display for presenting images;
   a security module interfaced with the touch device and operable to apply the attributes to encrypt communications sent from the information handling system and to decrypt communications received at the information handling system; and
   a reference module operable to present a reference image at the display, the reference image guiding an end user input of the physical gesture inputs.

16. The system of claim 15 wherein the attributes comprises motion of plural touch points relative to each other.

17. A method for securely communicating information, the method comprising:
   presenting a visual image at a display of an information handling system, the visual image providing a guide for performing a physical gesture at a touch device of the information handling system;
   inputting the physical gesture at the touch device of the information handling system; and
   applying attributes of the physical gesture to generate an encryption key at the information handling system, the encryption key providing access to encrypted information of the information handling system.

18. An information handling system comprising:
   plural processing components operable to process information;
   a touch device operable to accept one or more physical gestures of an end user and to save one or more predetermined attributes of the one or more physical gestures;
   a security module interfaced with the touch device, the security module operable to apply the one or more predetermined attributes to access encrypted information; and
   a reference module operable to present a visual image as a reference for performing the one or more physical gestures at the touch device, the reference aiding input at the touch device of the one or more physical gestures.

* * * * *